United States Patent [19]

Spencer

[11] 4,417,094
[45] Nov. 22, 1983

[54] UNDERWATER GAS-INSULATED CABLE WITH PLURAL INTERNAL PRESSURES

[75] Inventor: Edward M. Spencer, Chalfont, Pa.

[73] Assignee: Brown Boveri Electric Inc., Rolling Meadows, Ill.

[21] Appl. No.: 390,274

[22] Filed: Jun. 21, 1982

[51] Int. Cl.³ .................... H02G 5/06; H02G 9/02; H01B 9/06
[52] U.S. Cl. .................... 174/28; 174/23 R; 174/37
[58] Field of Search ............... 174/15 C, 16 B, 21 C, 174/22 R, 22 C, 23 R, 27, 28, 37, 38

[56] References Cited

U.S. PATENT DOCUMENTS

| | | | |
|---|---|---|---|
| 3,814,830 | 6/1974 | Cronin et al. | 174/22 C |
| 3,852,511 | 12/1974 | Artbauer | 174/22 C X |
| 4,224,462 | 9/1980 | Occhini et al. | 174/37 |

Primary Examiner—Laramie E. Askin

[57] ABSTRACT

A gas-insulated high voltage cable for submersion in water has an increased internal gas pressure in the interior of the outer cable housings which are to be at a depth greater than 100 feet. The wall thickness of the housings may be the same as that of housing sections which are at external ambient pressure or at an external pressure given by immersion in water at a depth of less than 100 feet. The increased pressure is applied to the housings through the central conductor which is continuous for the cable.

12 Claims, 3 Drawing Figures

UNDERWATER GAS-INSULATED CABLE WITH PLURAL INTERNAL PRESSURES

BACKGROUND OF THE INVENTION

Compressed gas-insulated transmission systems are well known and consist of a central tubular conductor concentric with an outer tubular sheath or housing, with compressed gas, usually an electronegative gas such as $SF_6$, filling the housing interior. Spacer insulators at intervals maintain the concentricity of the concentric tubes. Such systems have inherent advantages for transmission of electrical power due to high current capacity, low losses, and low capacitance of the cable. Such systems and cables are described in U.S. Pat. Nos. 4,132,855, entitled SUPPORT INSULATOR FOR GAS-FILLED HIGH-VOLTAGE TRANSMISSION LINE, issued Jan. 2, 1979, and 3,982,806, entitled PLUG-IN ELECTRIC CONTACT WITH IMPROVED CONTACT FINGER SUPPORT AND SHIELDING, issued Sept. 28, 1976. These cables can be used for underwater application as well for applications in which they are above ground or buried in the ground. Thus the cable can be advantageously used for lake crossings and for connection of power to and from off-short generators or installations, as shown in U.S. Pat. No. 3,794,849 entitled POWER TRANSMISSION SYSTEM FOR CONNECTING FLOATING POWER PLANT TO STATIONARY CONDUCTORS, issued Feb. 26, 1974.

A problem when submerging cable in water is that water may leak into the cable. A small leak of the insulating gas into the water would be harmless to the cable and leak rates of 1% or 2% per year are acceptable. Gas is simply added back into the system as part of the maintenance procedure. However, a small leak of water into the cable would probably cause a failure if the water collected as liquid rather than being evaporated into the gas space. Therefore, in underwater applications, it is desirable to maintain the gas pressure within the housing at a value higher than that of the water. Compressed gas-insulated systems using $SF_6$ commonly operate at about 60 p.s.i.g. The wall thickness of the outer housing, usually of aluminum, is designed to safely contain this pressure. Since this is the pressure of water at about a 120 foot depth, it follows that a safe, leak-proof depth for such a system would be about 100 feet.

To use the cable in depths of 200 feet, however, would require an increase in internal pressure to about 120 p.s.i.g. to ensure that the internal gas pressure would prevent leaking of water into the housing. That would require a heavier wall thickness for the outer housing if the outer housing is to safely contain this higher pressure. The increased wall thickness increases the weight and cost of the housing, even though the increased thickness is not needed in the parts of the cable that are exposed to lower water pressure at cable depths less than 100 feet or atmosphere only.

BRIEF SUMMARY OF THE INVENTION

In accordance with the invention, cable having a constant outer housing wall thickness is sectionalized such that the portion which will be above a water depth of 100 feet has an internal pressure of 60 p.s.i.g. and the portion which will be below 100 feet, and for example up to 200 feet deep, has a pressure of 120 p.s.i.g. The higher pressure in the deeper cable section is partly balanced by the outside water pressure so that the stress due to the differential pressure on the cable sheath or housing is never more than that of the cable at zero water depth with 60 p.s.i.g. internal gas pressure.

In a preferred embodiment of the invention, added pressure is obtained by maintaining the entire central conductor of the cable at a pressure of 120 p.s.i.g. Since the central conductor has a small diameter, this pressure does not cause too high a stress in the conductor. The interior of the conductor communicates with the interior of the annular space between the conductor and the sheath or outer housing in the deep section of the cable. Thus, no other conduit is necessary to carry gas to the deep, higher pressure sections and yet its pressure can be monitored and maintained from either end of the cable. A standard gas barrier insulation space is used at the 100 foot depth points in the cable to separate the two pressure systems.

If necessary, additional gas conduits may be provided within the conductor at even higher pressures to feed gas to and produce even higher pressure in even deeper portions of the cable.

DETAILED DESCRIPTION OF THE DRAWINGS

Figure 1:
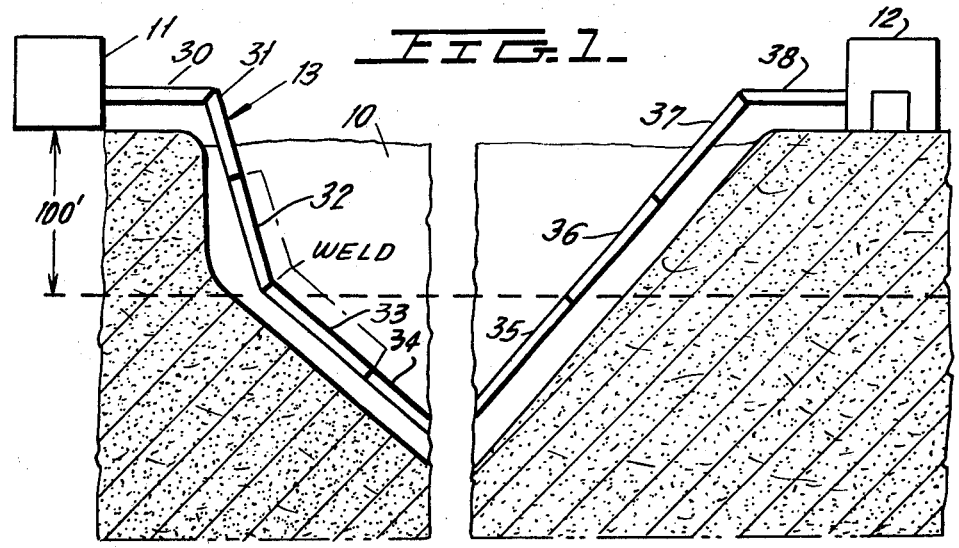
FIG. 1 is a schematic sectional diagram of a gas-insulated cable made in accordance with the invention which is partly submerged.

Referring first to FIG. 1, there is schematically shown a body of water 10 which could, for example, be a lake in which it is desirable to convey electric power at very high voltage, for example, in excess of about 320 kV from an installation 11 or one shore portion of the lake to an installation 12 at another shore portion of the lake. Installations 11 and 12 could be respective distribution stations, power generator stations, or the like. Alternatively, the body of water 10 could be a sea body between mainland and an offshore generator or power consumer, or the like.

A gas-insulated cable 13 spans the water body 10 and generally follows its bottom contour. Cable 13 can be made of rigid sections connected to one another of the kind shown in aforementioned U.S. Pat. No. 3,794,849, entitled POWER TRANSMISSION SYSTEM FOR CONNECTING FLOATING POWER PLANT TO STATIONARY CONDUCTORS. Each of the sections may have a length, for example, of 60 feet and an outer diameter of 14 inches for a 230 kV cable. Alternatively, the cable can consists of lengths of flexible cable having the structure shown in U.S. Pat. No. 4,100,367, entitled LATCH STRUCTURE FOR INSULATOR SPACER, issued July 11, 1978. In either case, the cable consists of a central conductor, shown as central conductor 20 in FIG. 2, surrounded by an outer metallic housing, shown as housing 22 in FIG. 2. The central conductor 20 and outer housing 22 are separated by conventional insulation spacers 24 of conical shape. Insulation spacers 24 may extend continuously across the full annular area between the central conductor 20 and outer housing 22, with the disks acting as gas barriers which prevent the movement of gas past the insulator region. Spacers 24 may also have openings such as openings 24a, shown for certain spacers 24 in FIG. 3, which permit passage of gas from one side of the insulator to the other.

In FIG. 1, a plurality of rigid sections 30 to 38 are shown which define the cable 13. The central conductors of each of sections 30 to 38 (not shown in FIG. 1) are joined together and form a continuous gas conduit along the full length of cable 13. The outer housings of each of sections 30 to 38 are joined together at watertight junctions. By way of example, the ends of the individual housings or sheaths may be welded at respective annular rings to prevent escape of gas from the interior of the continuous housing.

The outer housings 22 of each of sections 30 to 38 are made of aluminum and have a wall thickness of 0.25 inch. This permits each housing to safely contain an interior pressure of 60 p.s.i.g. of sulfur hexafluoride gas which is used to insulate the interior conductor from the external sheath. This internal pressure of 60 p.s.i.g. is also adequate to ensure against leakage of water into the cable at water depths less than 100 feet where the exterior water pressure is less than the internal gas pressure. Consequently, sections 30, 31, 32, 36, 37 and 38, which are all above the 100 foot depth, cannot experience water leaks. However, conduits 33, 34 and 35, which are below 100 feet, can experience water leaks since the external water pressure exceeds the internal gas pressure of the sections.

If the gas pressure of the entire system is increased, for example, to 120 p.s.i.g., to prevent leaks into the cable at depths below about 100 feet, the wall thickness of the outer housings would have to be increased to about 0.5 inch. This would increase the cost and weight of the cable.

In accordance with the invention, all cable sections are made with the same outer sheath thickness which is called for by an internal pressure of 60 p.s.i.g. and an exterior pressure less than that produced by water at a depth of 100 feet and only those sections which are below the 100 foot depth are provided with an increased internal pressure. The increased internal pressure is greater than the water pressure at the depth at which the section is located and, moreover, the added pressure reduces the pressure differential across the sheath to permit it safely to withstand the added internal pressure. Thus, a dual pressure system is provided for a cable of essentially identical housing sections wherein higher pressure is applied only to the deeper sections of the cable.

Figure 2:
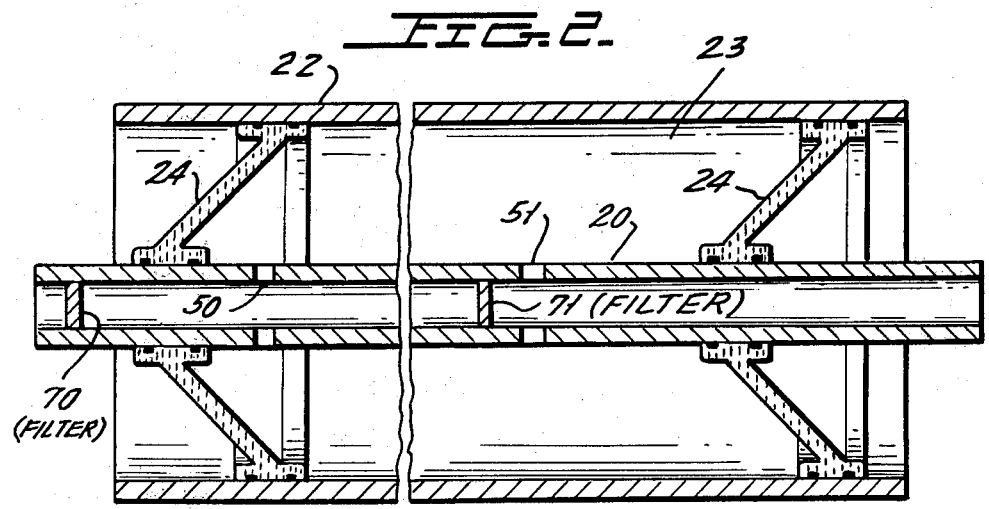
FIG. 2 is a cross-sectional view of one section of the deeper cable of the invention.
Figure 3:
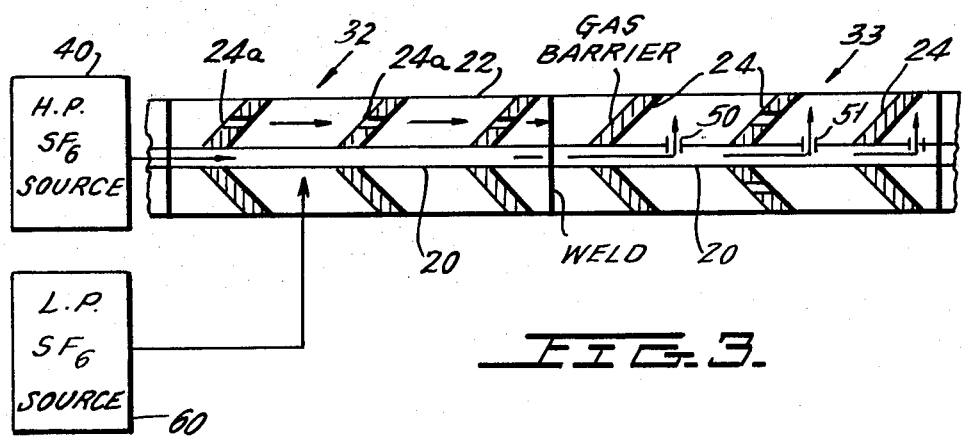
FIG. 3 schematically illustrates two cable sections arranged in accordance with the invention to be submerged above and below, respectively, a 100 foot water depth.

One manner in which the higher pressure can be applied to the deeper sections is shown in FIGS. 2 and 3. Thus, in FIG. 3, the two cable sections 32 and 33 of FIG. 1 are schematically shown. Their central conductors 20 are joined together in a sealed manner and form a continuous gas conduit. The central conductors may be of aluminum and have an outer diameter of 5 inches and a wall thickness of 0.5 inch. This continuous central conductor is then connected at one end to a source 40 of sulfur hexafluoride gas at a pressure of about 120 p.s.i.g. Note that the wall thickness of the aluminum conductor 20 is more than sufficient to safely contain this pressure.

The interior of conductor 20 of sections 30, 31, 32, 36, 37 and 38 is isolated from the interior of the annular volume 23 within their respective outer sheaths or housings 22.

The interiors of housings 30, 31, 32, 36, 37 and 38 are connected to a relatively low pressure source 60 of electronegative gas such as sulfur hexafluoride which might be at 60 p.s.i.g. The insulator spacers of the housings 30, 31, 32, 36, 37 and 38 may be of the type containing openings 24a to enable the easy circulation of the gas through the full lengths of the respective section. However, the conductor 20 of housings 33, 34 and 35 has openings, such as openings 50 and 51, which bring the high pressure gas of conductor 20 into the annular volume within housings 22. The ends of housings 33, 34 and 35 are preferably terminated with gas barrier spacers 24 so that their high pressure interiors will be isolated from the relatively low pressure interior of housings 30, 31, 32, 36, 37 and 38.

The manner in which gas fills the cable from a high or low gas pressure source is shown in FIG. 3 for adjacent sections 32 and 33 which have interior volumes at different respective pressures. Since gas flowing through the conductor 20 may become contaminated with dust, moisture or metal particles, filters, such as filters 70 and 71 of FIG. 2, can be placed in the conductors, or suitable filters can be placed in the openings, such as openings 50 and 51, leading to the outer annular space of the sections 33, 34 and 35. Note that the support insulators for each section are of the gas barrier type at the two cable regions which intersect the 100 foot depth. The insulators within each pressure region, however, may have openings to permit circulation of gas through the insulator.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A multi-pressure cable for transmission of electrical power at extremely high voltage; said cable comprising an elongated tubular central conductor and an outer coextensive sheath which is concentric with said central conductor and which encloses a gas-filled elongated annular volume; a plurality of support insulators spaced along the length of said cable for supporting said central conductor within said sheath; at least first and second adjacent lengths of said cable each adapted to be disposed in different ambient first and second pressures respectively; gas barrier means extending across said annular volume for isolating the portions of said elongated annular volume which are coextensive with said first and second lengths of said cable respectively; and gas at first and second different internal pressures filling the portions of said annular volume which are coextensive with said first and second lengths respectively; said first internal pressure and said first ambient pressure each being lower than said second internal pressure and said second ambient pressure respectively.

2. The cable of claim 1, wherein said gas is an electronegative gas, such as sulfur hexafluoride.

3. The cable of claim 2, wherein said first and second pressures are about 60 p.s.i.g. and 120 p.s.i.g. respectively.

4. The cable of claim 1, wherein said cable is adapted to be at least partly submerged in water.

5. The cable of claim 4, wherein said second length of cable is adapted for immersion in water at a depth greater than about 100 feet.

6. The cable of claim 5, wherein said gas is sulfur hexafluoride.

7. The cable of claim 6, wherein said first and second pressures are 60 p.s.i.g. and 120 p.s.i.g.

8. The cable of claim 1, wherein said sheath has the same wall thickness for its full length; said wall thickness being calculated to only safely contain a pressure which is less than said second internal pressure but which is sufficient to safely contain said second internal pressure and thereby exclude water leakage when the ambient pressure is said second ambient pressure.

9. The cable of claim 3, 4 or 5, wherein said sheath has the same wall thickness for its full length; said wall thickness being calculated to only safely contain pressures which are less than said second internal pressure but which is sufficient to safely contain said second internal pressure and thereby exclude water leakage when the ambient pressure is said second ambient pressure.

10. The cable of claim 1, 2, 3, 4, 5 or 8, wherein said elongated central tubular conductor has one end thereof connected to a source of said gas which is at said second internal pressure; the interior of said central tubular conductor communicating with the interior of said elongated annular volume of said second length of said cable and isolated from the interior of said elongated annular volume of said first length of said cable.

11. The cable of claim 1, wherein said sheath has the same wall thickness for its full length; said wall thickness being calculated to only safely contain a pressure which is less than said second internal pressure but which is insufficient to safely contain said second internal pressure when the ambient pressure is said first ambient pressure.

12. The cable of claim 3, 4 or 5, wherein said sheath has the same wall thickness for its full length; said wall thickness being calculated to only safely contain pressures which are less than said second internal pressure but which is insufficient to safely contain said second internal pressure when the ambient pressure is said first ambient pressure.

* * * * *